United States Patent
Streib

(10) Patent No.: US 6,507,198 B1
(45) Date of Patent: Jan. 14, 2003

(54) METHOD AND ARRANGEMENT FOR DETECTING A FAULT IN THE CONTEXT OF MEASUREMENT QUANTITIES IN A MOTOR VEHICLE

(75) Inventor: Martin Streib, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/576,072

(22) Filed: May 22, 2000

(30) Foreign Application Priority Data

May 22, 1999 (DE) .......................................... 199 23 688

(51) Int. Cl.[7] .............................................. F02D 43/00
(52) U.S. Cl. ........................ 324/523; 123/396; 701/114
(58) Field of Search ................................. 324/500, 522, 324/524, 523; 123/396; 701/114; 73/118.1

(56) References Cited

U.S. PATENT DOCUMENTS

| | | | | |
|---|---|---|---|---|
| 4,603,675 A | * | 8/1986 | Junginger et al. | 123/478 |
| 5,216,916 A | * | 6/1993 | Bederna et al. | 73/118.1 |
| 5,260,877 A | * | 11/1993 | Drobny et al. | 701/114 |
| 5,320,076 A | * | 6/1994 | Reppich et al. | 123/399 |
| 5,602,732 A | * | 2/1997 | Nichols et al. | 701/29 |
| 5,654,888 A | * | 8/1997 | Müller et al. | 701/54 |
| 5,673,668 A | * | 10/1997 | Pallett et al. | 123/436 |

* cited by examiner

*Primary Examiner*—N. Le
*Assistant Examiner*—Vincent Q. Nguyen
(74) *Attorney, Agent, or Firm*—Walter Ottesen

(57) ABSTRACT

The invention is directed to a method and an arrangement for detecting faults in the context of measurement quantities in a motor vehicle. At least one measurement quantity is represented by two redundant signal values. The time-dependent changes of the signal values are determined for fault recognition and a fault condition can be assumed when the signal changes no longer correlate with each other. The arrangement for fault recognition includes an input circuit of a control apparatus to which the measurement quantities are supplied via two lines from two measuring devices. One line is provided with a resistor to ground or to the supply voltage; whereas, the other line is configured without such a resistor or has a resistor to the supply voltage or to ground having an ohmage higher than the first resistor.

10 Claims, 3 Drawing Sheets

METHOD AND ARRANGEMENT FOR DETECTING A FAULT IN THE CONTEXT OF MEASUREMENT QUANTITIES IN A MOTOR VEHICLE

BACKGROUND OF THE INVENTION

An example of a method and an arrangement for detecting an error in the context of measurement quantities in a motor vehicle is disclosed, for example, in German patent publication 4,204,623. The method and arrangement proceed from a measurement value detection system, especially for detecting the position of an actuating element determining the power of an internal combustion engine, such as a throttle flap, wherein the measurement quantity is detected by at least two redundant measuring devices. The measurement signals are supplied to a microcomputer without pull-up or pull-down resistors being present on the signal lines with these pull-up and pull-down resistors having been used up to that time point. For interruptions in the signal line, these resistors serve to pull the signal level at the input of the microcomputer to a defined value which lies outside of the pregiven signal value range. The defective performance of at least one measuring device can be determined by means of a conventional signal range check. Possibly unwanted fault detection could occur for the dimensioning of these resistors which is correct for the purpose intended. To avoid this unwanted fault detection, in the known solution, it has been suggested to do without these resistors for both measuring devices. To detect faults, a controllable electrical switch is inserted in at least one supply line of the measuring devices. This switch is driven in the context of a testing operation to determine interruptions of the signal line and similar fault conditions. However, the complexity of the arrangement is increased with such an electrically actuable switch. Furthermore, the function of the control, which is carried out in dependence upon the measurement quantities, is possibly negatively affected.

SUMMARY OF THE INVENTION

It is an object of the invention to provide a method for fault detection in measurement quantities in a motor vehicle which makes possible a reliable fault detection without requiring the additional complexity necessitated in the known solution. Furthermore, it is an object of the invention to provide an arrangement for detecting a fault in measurement quantities in a motor vehicle which makes possible a reliable fault detection while avoiding the above-mentioned disadvantages.

The method of the invention is for detecting a fault in the context of a measurement quantity in a vehicle. The method includes the steps of: providing redundant first and second signal values for the measurement quantity; comparing the time-dependent changes of the two signal values; and, detecting a fault condition when the time-dependent changes do not correlate with each other.

The method of the invention permits a reliable fault detection to be undertaken for measurement quantities in motor vehicles without additional complexity and especially without the complexity associated with switches. It is especially advantageous that the plausibility comparison of two redundant signals of the measurement quantity is undertaken on the basis of the relative signal change and not on the basis of absolute signal values. In this way, lower tolerances can be achieved because the linearity tolerances of the measuring devices are substantially eliminated because of the differential consideration.

With the use of potentiometers as measuring devices, it is especially advantageous that the monitoring can even be carried out when the signals are incorrect because of possible contact resistances in one of the potentiometers. The measuring devices can, for example, be for detecting the position of a power actuating element or an operator-controlled element. This incorrectness does not lead to an unwanted fault detection in the relative plausibilization which is in contrast to the plausibility comparison on the basis of absolute values.

In an especially advantageous manner, pull-up and/or pull-down resistors are omitted in the signal line of the measuring device or very high ohmage resistors are used (much greater than 500 KOhms). The measurement quantities of the measuring devices are evaluated when carrying out a control function. For the redundant measuring device for the above, such resistors are used in a manner known per se in order to reliably detect a defective performance of this measuring device in the context of a signal-range check. This has the advantage that falsifications of the signal of the first measuring device do not lead to an unwanted fault detection in the context of the signal range check because this signal range check is replaced by the differential monitoring of the signal values. Securing this differential plausibilization takes place, inter alia, via the signal-range check in the signal of the second measuring device which reliably detects faults in the region of the signal line and of the second measuring device in a conventional manner because of the pull-up and/or pull-down resistors.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
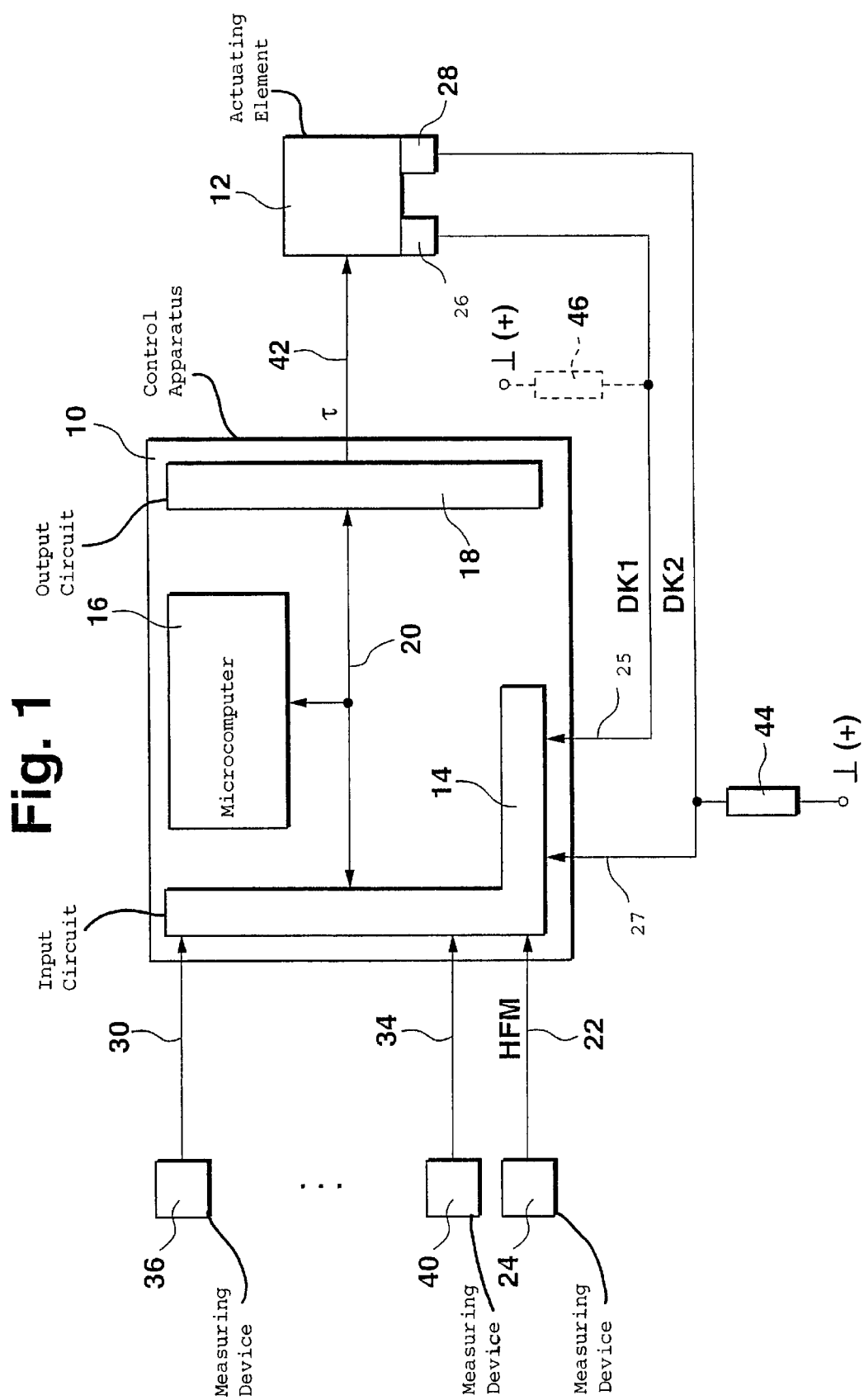
FIG. 1 is a block circuit diagram of a control arrangement for controlling an actuating element of a vehicle.

FIG. 1 shows, in the context of a preferred embodiment, a control apparatus 10 for controlling an actuating element 12 of an internal combustion engine such as a throttle flap. The control apparatus 10 includes at least an input circuit 14, a microcomputer 16 and an output circuit 18 which are connected to each other via a communication system 20.

Various input lines are connected to the input circuit 14. A first input line 25 leads from a first measuring device 26 to the input circuit 14 and this measuring device 26 is for detecting the position (DK1) of the actuating element 12. A second input line 27 leads from a second measuring device 28 to the input circuit 14. The measuring device 28 is redundant to the first measuring device 26 and also detects the position (DK2) of the actuating element 12. A third input line 22 leads from a measuring device 24 to the input circuit 14. The measuring device 24 is provided for detecting the air supply (HFM) to an internal combustion engine.

Furthermore, additional input lines 30 to 34 are provided which originate from measuring devices 36 to 40 for detecting additional operating variables of the engine and/or of the vehicle. operating variables of this kind include, for example, the position of an operator-controlled element actuated by the driver, the temperature of the engine, the rpm of the engine, et cetera. These operating variables are evaluated in the control apparatus of the actuating element. The electrically actuable actuating element 12 is actuated by the control apparatus 10 via at least one output line 42 which leads from the output circuit 18 to the actuating element. The use of pull-up and/or pull-down resistances is a feature of the invention in connection with the detection of measurement quantities and the supply of these quantities in the context of the measuring devices 26 and 28.

The signal of the measuring device 28 is only available in the case of an emergency for evaluation in connection with the control of the actuating element; otherwise, the signal of the measuring device 28 is evaluated for monitoring the signal value of the first measuring device 26 in the context of plausibility comparisons. A resistor 44 is provided in the signal line 27 of the second measuring device 28 and is switched from the signal line 27 to ground (⊥) or to a supply voltage (+). The magnitude of the resistance of this resistor is so selected that the potential at the input of the input circuit 14 lies reliably outside of the normal signal value range of the measuring device 28 when there is an interruption of the signal line. Such a fault condition is therefore detected on the basis of a signal-range check.

In one embodiment, the measuring device 28 is configured as a potentiometer and the magnitude of this resistance of approximately 470 KOhm has been shown to be suitable. In contrast, a resistance of this kind is dispensed with in the signal line 25 or at least a very high ohmage value of this resistance is pregiven in the signal line 25 of the measuring device 26 (see the phantom outline of resistor 46 which is likewise switched from the signal line to ground (⊥) or to the supply voltage (+)). This value of the resistance 46 is significantly greater than the value of the resistance 44 on the signal line 27 so that erroneous signals because of this resistance under special operating conditions cannot occur. These special conditions include, for example, the situation where there is a very high contact resistance between the potentiometer track and the wiper contact. A reliable signal-range check is, however, no longer ensured because, under circumstances, the potential on the line lies in the plausible range notwithstanding the error.

For the above reasons, the signal-range check in combination with the measurement quantity of the measuring device 26 is not used. The measurement quantity of the measuring device 26 is evaluated for controlling the actuating element, for example, in the context of a position control. In lieu of the signal-range check, the time-dependent change of the measurement quantity of the measuring device 26 (or a measurement value derived therefrom) and the time-dependent change of the corresponding value of the measuring device 28 are compared to each other.

The differential plausibility comparison is also carried out in the idle range. The differential plausibilization of the two signals would announce an unplausible condition for a possible incorrectness of a signal because of an occurring contact resistance at the potentiometer. In the next run-through, the condition would again be plausible because of the differential consideration. No unwanted fault reaction occurs because of the debounce circuit provided.

In the preferred embodiment, the measuring devices are potentiometers which detect the position of a power actuator element of an internal combustion engine. The method and arrangement according to the invention are, however, not limited to an arrangement of this kind. Rather, the invention can be applied in combination with contactless position transducers as well as for the position of the accelerator pedal or brake pedal and in combination with measuring devices for other operating variables of the drive unit or vehicle which detect the same quantities, in a different manner, as needed. Accordingly, the application of the invention is not limited to the drive unit but can be used also in combination with other actuator elements of the vehicle such as the wheel brakes.

In the preferred embodiment, the above-mentioned procedure is realized as a program of the microcomputer 16. The change of the signal of the first measuring device 26 and the change of the signal of the second measuring device 28 are formed at fixed time intervals and, in each case, referred to a previous value, preferably the most recent value. If the two signals are plausible with respect to each other, then both signals would have to show the same change except for the deviations with respect to linearity and slight disturbances caused by the contact resistances in the permissible range.

The measuring devices can have a different dependency of the signal magnitude from the measurement quantity. In the above comparison, and depending upon the configuration of the measuring devices, it can be necessary to convert the detected quantities to a common physical value (for example, where there is redundant detection of positions when the deflection and the actuating force are measured). In this case, the differential plausibility check takes place on the basis of this physical value. If the signal line, for example, of the measuring device 26, is interrupted, the voltage on this signal line drifts to a value which has nothing to do with the actual operating variable (for example, the throttle flap position). This drift depends upon the actual shunts and leakage currents.

In the preferred embodiment of a position control, the position controller controls the actuating element either in a direction of closing or in a direction of opening because the desired value and the transmitted actual value no longer correlate. From this, a signal change of the signal value of the measuring device 28 results which operates correctly. The signal change of the measuring device 28 is uncorrelated to the signal change of the signal of the measuring device 26. Accordingly, a fault condition is recognized. The actual value of the measuring device 26 is switched over to the measuring device 28 as a fault reaction after an adjustable debounce time, that is, a pregiven number of program run-throughs with fault recognition. However, this measure is only performed when the signal on the measuring device 28 is in order, that is, for example, no signal-range check faults are shown and, in the preferred embodiment, the signal is plausible with a signal determined by a measuring device for detecting the air supply to the engine.

Figure 2:
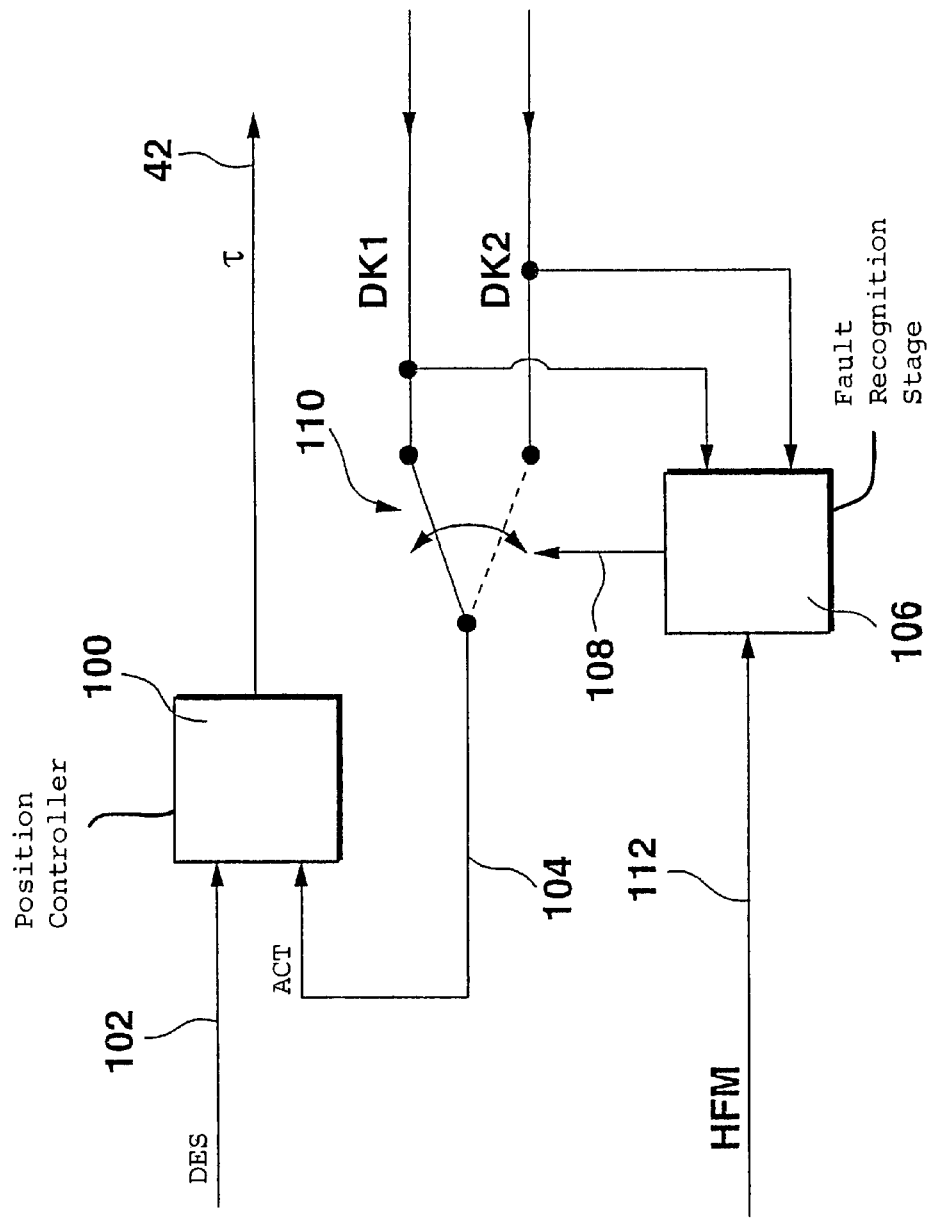
FIG. 2 is a sequence diagram for controlling the actuating element in dependence upon the measurement quantities which are monitored for faults; and, FIG. 3 is a flowchart showing a preferred embodiment of the method for detecting a fault.
Figure 3:
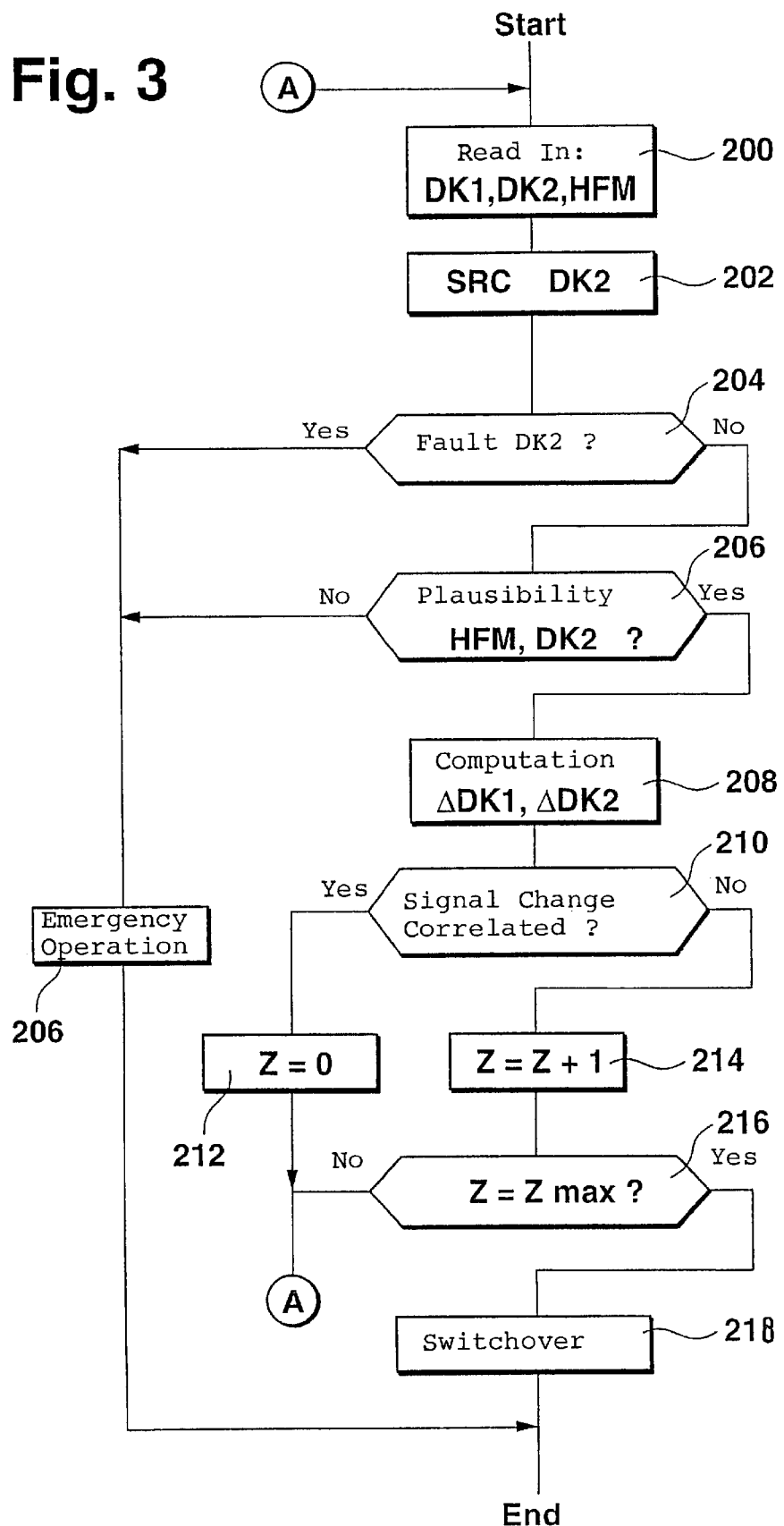

A preferred embodiment of the above-described procedure is shown in the sequence diagram of FIG. 2 and the flowchart of FIG. 3. In FIG. 2, a position controller 100 is shown which receives a desired value DES on input line 102. The desired value DES is for the position of the actuator element to be driven. In the preferred embodiment, this desired value is determined at least on the basis of the accelerator pedal position. Furthermore, the position controller 100 receives the actual value ACT via the line 104. The actual value ACT is derived, in normal operation, from the signal value DK1 of the measuring device 26. In accordance with a pregiven control strategy, the position controller 100 determines a drive signal ⊥ from the deviation between desired and actual values. The drive signal ⊥ is outputted via the line 42 for actuating the actuating element 12.

A positioning signal, which is redundant to the signal DK1, is derived from the signal DK2 of the measuring device 28. This positioning signal is supplied and both of the signals DK1 and DK2 are logically coupled to each other in the fault recognition stage 106 as described above. In the case of a fault, and under the precondition that the signal DK2 is in order, a switching signal is generated via the line 108 and switches the switching element 110 into the position shown in phantom outline. This means that, in the case of a fault, the correctly operating signal DK2 serves as the basis of the actual value ACT in lieu of the signal DK1.

In the preferred embodiment, the signal HFM for the air supplied to the engine is also evaluated for fault recognition in the fault recognition stage 106.

The elements shown in FIG. 2 are realized as programs of the microcomputer 16 of the control apparatus 10. Such a program is shown in FIG. 3 in the context of a flowchart for the fault recognition stage 106.

The program is run through at pregiven time intervals, for example, 10 milliseconds. In the first step 200, the measurement quantities DK1, DK2 and HFM are read in. Thereupon, a comparison takes place in step 202 of the value DK2 with the upper and lower limits (signal-range check). In the next step 204, a check is made as to whether a fault is present in the signal DK2. If this is the case (that is, if this signal exceeds or drops below the pregiven limit values) then, and in accordance with step 206, an emergency operation of the vehicle is initiated in that, for example, the power of the drive unit of the vehicle is limited. Thereafter, the program is ended and is only run through again when the control apparatus 10 is again taken into operation. If it had resulted in step 204 that no fault is present in the signal DK2, then in the next step 206, a check is made as to whether the signals DK2 and HFM are plausible with respect to each other. This takes place via a comparison of the two signals. At least one signal is so converted that it can be compared to the other. If no plausibility is given, then the program continues with step 206 and the emergency operation of the control. If plausibility is present, one can assume in combination with the result of step 204 that the signal DK2 is okay. This means that the signal changes ΔDK1 and ΔDK2 are determined in step 208 on the basis of the actual measurement quantities and a previously occurring measurement quantity and preferably the measurement quantity read in from the last program run-through. Thereupon, in step 210, a check is made as to whether both signal changes are correlated to each other.

In the preferred embodiment, the above is carried out in such a manner that the algebraic sign of the change as well as the magnitude of the change are compared to each other and the correlation of the signal changes is assumed when the signs are the same and the magnitude of the changes lie in a pregiven tolerance range with respect to each other. If this is the case, then, in step 212, the counter Z is set to the value 0 which serves for fault debouncing. After step 212, the program is repeated with step 200.

If step 212 had yielded that the signal changes do not correlate with each other in the context of the pregiven tolerances, then, the counter Z is incremented by 1 in step 214. Thereupon, in step 216, the count of counter Z is compared to a maximum value. If the maximum value is not reached, then the program is continued with step 200. On the other hand, if the maximum value is reached, the program is continued with step 218 in which the actual value is now formed on the basis of the measurement quantity DK2 and no longer on the basis of the measurement quantity DK1. This is so because one can assume a fault condition in the area of the measurement quantity DK1.

Thereafter, the program is ended and the monitoring of measurement quantity DK2 is carried out only on the basis of the steps 204 and 206 and, if required, while limiting the power of the drive unit.

It is understood that the foregoing description is that of the preferred embodiments of the invention and that various changes and modifications may be made thereto without departing from the spirit and scope of the invention as defined in the appended claims.

What is claimed is:

1. A method of detecting a fault in the context of a measurement quantity in a vehicle, the method comprising the steps of:

providing redundant first and second signal values for said measurement quantity utilizing respective measuring devices having linearity tolerances;

comparing time-dependent changes of said two signal values thereby substantially eliminating said tolerances; and, detecting a fault condition when said time-dependent changes do not correlate with each other.

2. The method of claim 1, wherein a fault condition is only detected when a fault condition occurs several times consecutively.

3. The method of claim 1, wherein said two signal values are first and second signal values; and, the method comprising the further steps of:

evaluating said first signal value for controlling said vehicle;

using said second signal value to check said first signal value by comparing said first and second signal values to detect said fault condition; and, in the case of a fault, switching over to said second signal value for controlling said vehicle provided said second value is correct.

4. The method of claim 1, wherein said two signal values are first and second signal values; and, the method comprising the further step of carrying out a signal-range check for said second signal value.

5. The method of claim 4, wherein said signal values represent the position of an actuating element of an internal combustion engine; and, a plausibility comparison of said second signal value is carried out with a measurement signal value, which represents the air supply to said engine; and, a fault condition is detected in said second signal value when the two signals are not plausible to each other.

6. The method of claim 1, comprising the further step of:

forming the time-dependent changes of said signal values on the basis of the actually measured signal value and a previously detected signal value.

7. The method of claim 6, wherein said previously detected signal value is the last detected signal value.

8. A method of detecting a fault in the context of a measurement quantity in a vehicle, the method comprising the steps of:

providing redundant first and second signal values for said measurement quantity;

comparing time-dependent changes of said two signal values;

detecting a fault condition when said time-dependent changes do not correlate with each other;

said two signal values being respective first and second signal values; and, said signal values representing the position of an actuating element which is set in the context of a position control system whose actual value is said first signal in normal operation and whose actual value is said second signal value after switchover.

9. An arrangement for detecting a fault in the case of a measurement quantity in a vehicle, the arrangement comprising:

a first measuring device for detecting a first signal value of a measurement quantity;

a second measuring device for detecting a second signal value of said measurement quantity with said first and second signal values being redundant to each other;

a control apparatus including an input circuit;

a first signal line connecting said first measuring device to said input circuit;

a second signal line connecting said second measuring device to said input circuit;

a first resistor connected between said second signal line and one of ground and a supply voltage for providing a predetermined voltage level in the event of an interruption in said second signal line; and, said first line being configured in one of the following ways: (a) without a resistor connected to ground or said voltage supply; and, (b) with a second resistor connected to ground or said voltage supply with said second resistor having an ohmage significantly greater than said first resistor.

10. An arrangement for detecting a fault in the case of a measurement quantity in a vehicle, the arrangement comprising:

a first measuring device for detecting a first signal value of a measurement quantity;

a second measuring device for detecting a second signal value of said measurement quantity with said first and second signal values being redundant to each other;

said first and second measuring devices having respective linearity tolerances;

a control apparatus including an input circuit connected to said first and second measuring devices; and, said control apparatus including a microcomputer having a program functioning to compare time-dependent changes of said first and second signal values to each other whereby said linearity tolerances are substantially eliminated; and, detecting a fault condition when the changes of said signal values do not correlate with each other.

* * * * *

UNITED STATES PATENT AND TRADEMARK OFFICE
CERTIFICATE OF CORRECTION

PATENT NO. : 6,507,198 B1
DATED : January 14, 2003
INVENTOR(S) : Martin Streib

It is certified that error appears in the above-identified patent and that said Letters Patent is hereby corrected as shown below:

<u>Column 7,</u>
Line 3, -- value -- should be inserted after "signal".

Signed and Sealed this

Eighth Day of July, 2003

JAMES E. ROGAN
*Director of the United States Patent and Trademark Office*